(12) United States Patent
Adler et al.

(10) Patent No.: US 10,192,450 B2
(45) Date of Patent: Jan. 29, 2019

(54) AIRCRAFT TRAFFIC SPACING AND TIMING CONTROL WITH DYNAMIC FLIGHT PATH VARIATION

(71) Applicant: The Boeing Company, Chicago, IL (US)

(72) Inventors: Charles Otis Adler, Bellevue, WA (US); Sheila Ruth Conway, Seattle, WA (US); Douglas A. Stoll, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 274 days.

(21) Appl. No.: 15/245,309

(22) Filed: Aug. 24, 2016

(65) Prior Publication Data
US 2018/0061246 A1    Mar. 1, 2018

(51) Int. Cl.
*G05D 1/10*    (2006.01)
*G08G 5/00*    (2006.01)
(Continued)

(52) U.S. Cl.
CPC .......... *G08G 5/0039* (2013.01); *G08G 5/006* (2013.01); *G08G 5/0026* (2013.01);
(Continued)

(58) Field of Classification Search
CPC ...... G08G 5/0039; G08G 5/045; G08G 5/025; G08G 5/0082; G08G 5/0043; G08G 5/006;
(Continued)

(56) References Cited

U.S. PATENT DOCUMENTS 8,185,258 B2    5/2012   Dey et al.
8,731,810 B2    5/2014   Conway
(Continued)

FOREIGN PATENT DOCUMENTS

EP    1 818 891      8/2007
EP    2 927 893      7/2015
WO   WO 2012/078231  6/2012

OTHER PUBLICATIONS

Extended European Search Report prepared by the European Patent Office in application No. EP 17 17 6276 dated Jan. 30, 2018.

*Primary Examiner* — Thomas Ingram
(74) *Attorney, Agent, or Firm* — McDonnell Boehnen Hulbert & Berghoff LLP

(57) ABSTRACT

An example method for aircraft traffic spacing and timing control with flight path variation of an aircraft includes receiving information of aircraft traffic for an area, determining an aircraft spacing plan for the aircraft traffic for the area based on spacing requirements due to separation standards or flow management constraints for the aircraft traffic, determining that a modification to a flight path of an aircraft is required to meet a longitudinal spacing requirement between the aircraft and one or more additional aircraft of the aircraft traffic based on the aircraft spacing plan, determining a flight path modification to the flight path for the aircraft based on the modification that causes the aircraft to remain within associated margins of the RNP instrument flight procedure and alters the longitudinal spacing between the aircraft and the additional aircraft of the aircraft traffic, and assigning the flight path modification to the aircraft via a data communication link.

20 Claims, 9 Drawing Sheets

(51) Int. Cl.
*G08G 5/02* (2006.01)
*G08G 5/04* (2006.01)
*H04W 4/80* (2018.01)

(52) U.S. Cl.
CPC ......... *G08G 5/0043* (2013.01); *G08G 5/0082* (2013.01); *G08G 5/025* (2013.01); *G08G 5/045* (2013.01); *G05D 1/104* (2013.01); *G08G 5/0013* (2013.01); *H04W 4/80* (2018.02)

(58) Field of Classification Search
CPC ..... G08G 5/0026; G08G 5/0013; H04W 4/80; G05D 1/104
See application file for complete search history.

(56) References Cited

U.S. PATENT DOCUMENTS

| | | | |
|---|---|---|---|
| 2008/0086243 A1* | 4/2008 | Caillaud ................ | G05D 1/101 701/3 |
| 2008/0103646 A1 | 5/2008 | Lucas et al. | |
| 2010/0217510 A1* | 8/2010 | Deker .................... | G08G 5/025 701/120 |
| 2012/0004837 A1* | 1/2012 | McDonald ........... | G08G 5/0039 701/120 |
| 2013/0110388 A1 | 5/2013 | Becher et al. | |
| 2016/0171895 A1 | 6/2016 | Schart et al. | |

* cited by examiner

AIRCRAFT TRAFFIC SPACING AND TIMING CONTROL WITH DYNAMIC FLIGHT PATH VARIATION

FIELD

The present disclosure relates generally to methods for modifying a flight path of an aircraft, and more particularly to calculating, by a system onboard the aircraft, as well as by ground based systems, a modification to the flight path to be flown by the aircraft that causes the aircraft to remain within containment boundaries of a Required Navigation Performance (RNP) instrument flight procedure while meeting the spacing and/or required arrival time requirements of the air traffic controller. Example methods utilize capability to modify flight paths to provide air traffic controllers with improved operational capabilities for spacing aircraft and for meeting required aircraft arrival times.

BACKGROUND

Performance-Based Navigation (PBN), including the widely used Required Navigation Performance (RNP) and Area Navigation (RNAV) instrument procedures, is a key part of airspace modernization worldwide. For example, RNAV and RNP-based procedure deployment is a component of the United States' airspace modernization, the Federal Aviation Administration (FAA) NextGen program, that is implementing new PBN routes and procedures to leverage emerging technologies and aircraft navigation capabilities. Modern commercial aircraft fly PBN flight paths with very high precision. The aircraft can exploit high accuracy provided by global positioning system (GPS)-based navigation systems, modern Flight Management Systems (FMSs) and Flight Control Systems (FCSs). Due to this highly accurate path-keeping capability, the use of PBN removes much of the variability traditionally seen in aircraft flight paths, and results in highly repeatable operations.

The benefits of using RNAV and RNP procedures thus include improved aircraft stability on approach, improved aircraft predictability for air traffic control, reduced fuel burn, lower track miles, improved airport capacity and paths tailored to avoid noise sensitive areas. However, these same procedures can be detrimental for the same reason because increased precision on flight paths can also concentrate noise over underlying communities.

While accuracy and repeatability can be desirable, there are a number of operational and safety issues that could benefit from judicious variation in flight paths. For example, in approach operations, a concentrated noise footprint stemming from repeatable operations creates noise issues for communities under the flight paths. In addition, fixed, consistent flight paths mean that air traffic controllers (ATC) lose some ability to fine-tune aircraft longitudinal spacing that the ATC once exercised by vectoring traffic. Furthermore, highly repeatable path-keeping traffic means a higher risk of loss of separation between aircraft if the concentrated portions of the traffic streams conflict.

Existing solutions related to path variation with use of RNP are limited to offsetting flight paths relative to the originally-defined procedure. For example, ATC may pull some traffic off of fixed routes to avoid or organize traffic using vectors. However, this negates efficiency and other benefits of fixed track use, and limits the ability of on-board aircraft systems to provide alerts supporting high integrity guidance and navigation. Further solutions provide for aircraft to fly an offset path, in which both the offset path and associated boundaries are shifted by an amount of the offset. However, this method is not usable in constrained airspace associated with arrival, approach and departure routes in a vicinity of airports where locations of original boundaries may be integral to safe operations.

What is needed is a method that enables use of the full margins of an RNP procedure based on measured performance to support air traffic controllers with more effective tools for determining clearances that will retain efficiency while managing the spacing/timing of aircraft and also addressing community noise concerns and constraints.

SUMMARY

In one example, a method for aircraft traffic spacing and timing control with flight path variation of an aircraft is described. The method includes receiving, at a communication interface of a computing device, information of aircraft traffic for an area, and determining, by the computing device, an aircraft spacing plan for the aircraft traffic for the area based on spacing requirements due to one or more separation standards or flow management for the aircraft traffic. The method also includes determining that a modification to a flight path of an aircraft is required to meet a longitudinal spacing requirement between the aircraft and one or more additional aircraft of the aircraft traffic based on the aircraft spacing plan. The aircraft is flying a required navigation performance (RNP) instrument flight procedure that indicates a fixed-route accuracy and containment boundaries required during flight for the aircraft to fly a path between two points along the flight path, and the containment boundaries are defined by a flight path centerline with limits determined by associated margins. The method also includes determining, by the computing device, a flight path modification to the flight path for the aircraft based on the modification that causes the aircraft to remain within the associated margins of the RNP instrument flight procedure and alters the longitudinal spacing between the aircraft and the one or more additional aircraft of the aircraft traffic, and assigning the flight path modification to the aircraft via a data communication link.

In another example, an aircraft traffic spacing and timing control system is described that includes a communication interface for receiving information of aircraft traffic for an area, and one or more processors for executing instructions stored on data storage to determine an aircraft spacing plan for the aircraft traffic for the area based on spacing requirements due to one or more separation standards or flow management for the aircraft traffic, and to determine that a modification to a flight path of an aircraft is required to meet a longitudinal spacing requirement between the aircraft and one or more additional aircraft of the aircraft traffic based on the aircraft spacing plan. The aircraft is flying a required navigation performance (RNP) instrument flight procedure that indicates a fixed-route accuracy and containment boundaries required during flight for the aircraft to fly a path between two points along the flight path, and the containment boundaries are defined by a flight path centerline with limits determined by associated margins. The system also includes an output interface for outputting to the aircraft, based on the modification, a flight path modification to the flight path via a data communication link. The flight path modification causes the aircraft to remain within the associated margins of the RNP instrument flight procedure and alters the longitudinal spacing between the aircraft and the one or more additional aircraft of the aircraft traffic.

In another example, a non-transitory computer readable storage medium is described having stored therein instructions, that when executed by a system having one or more processors, causes the system to perform functions. The functions include receiving information of aircraft traffic for an area, determining an aircraft spacing plan for the aircraft traffic for the area based on spacing requirements due to one or more separation standards or flow management for the aircraft traffic, and determining that a modification to a flight path of an aircraft is required to meet a longitudinal spacing requirement between the aircraft and one or more additional aircraft of the aircraft traffic based on the aircraft spacing plan. The aircraft is flying a required navigation performance (RNP) instrument flight procedure that indicates a fixed-route accuracy and containment boundaries required during flight for the aircraft to fly a path between two points along the flight path, and the containment boundaries are defined by a flight path centerline with limits determined by associated margins. The functions also include determining a flight path modification to the flight path for the aircraft based on the modification that causes the aircraft to remain within the associated margins of the RNP instrument flight procedure and alters the longitudinal spacing between the aircraft and the one or more additional aircraft of the aircraft traffic, and assigning the flight path modification to the aircraft via a data communication link.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Described below are example systems and methods to implement variation in flight paths that can provide air traffic controllers with increased spacing and timing control authority and also assist with the beneficial spreading or tailoring of a noise footprint stemming from repeatable operations as well as reducing concentrated traffic patterns for overflown communities.

An example method for aircraft traffic spacing and timing control with flight path variation of an aircraft includes receiving information of aircraft traffic for an area, determining an aircraft spacing plan for the aircraft traffic for the area based on spacing requirements due to separation standards or flow management for the aircraft traffic, determining that a modification to a flight path of an aircraft is required to meet a longitudinal spacing requirement between the aircraft and one or more additional aircraft of the aircraft traffic based on the aircraft spacing plan, determining a flight path modification to the flight path for the aircraft based on the modification that causes the aircraft to remain within associated margins of the RNP instrument flight procedure and alters the longitudinal spacing between the aircraft and the additional aircraft of the aircraft traffic, and assigning the flight path modification to the aircraft via a data communication link for voice or digital instructions.

Figure 1:
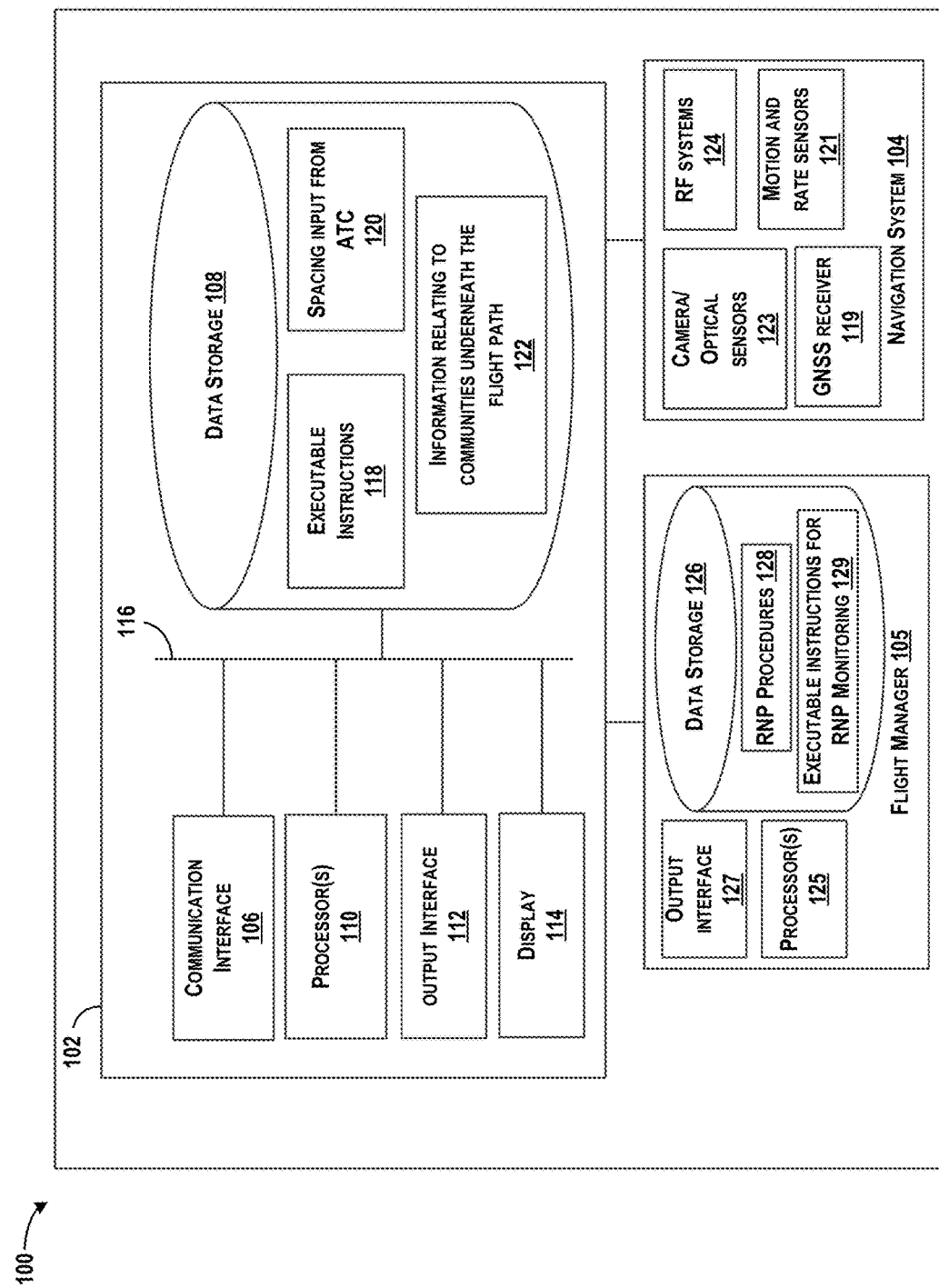
FIG. 1 is a block diagram of an aircraft, according to an example embodiment.

Referring now to FIG. 1, a block diagram of an aircraft 100 is illustrated, according to an example embodiment. The aircraft 100 includes a system 102 onboard the aircraft 100 that is in communication with a navigation system 104 and a flight manager 105 onboard the aircraft 100.

The system 102 includes a communication interface 106, data storage 108, one or more processor(s) 110, an output interface 112, and a display 114 each connected to a communication bus 116. The system 102 may also include hardware to enable communication within the system 102 and between the system 102 and other devices (not shown). The hardware may include transmitters, receivers, and antennas, for example.

The communication interface 106 may be a wireless interface and/or one or more wireline interfaces that allow for both short-range communication and long-range communication to one or more networks or to one or more remote devices. Such wireless interfaces may provide for communication under one or more wireless communication protocols, such as voice communications using Very High Frequency (VHF) radio, VHF Data link (VDL), VDL Mode 2, Aircraft Communications Addressing and Reporting System (ACARS) digital communications over VHF radio, satellite communications (SATCOM Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include aircraft data buses such as Aeronautical Radio, Incorporated (ARINC) 429, 629, or 664 based interfaces, Ethernet interface, a Universal Serial Bus (USB) interface, or similar interface to communicate via a wire, a twisted pair of wires, a coaxial cable, an optical link, a fiber-optic link, or other physical connection to a wireline network.

Thus, the communication interface 106 may be configured to receive input data from one or more devices, and may also be configured to send output data to other devices. In some examples, the communication interface 106 may also maintain and manage records of data received and sent by the system 102. The communication interface 106 may also include a receiver and transmitter to receive and send data. In other examples, the communication interface 106 may also include a user-interface, such as a keyboard, microphone, touchscreen, etc., to receive inputs as well.

In examples described below, the communication interface 106 receives real time positioning of the aircraft 100 during flight from the navigation system 104, and also receives an actual navigation performance (ANP) of the aircraft 100 as calculated or determined by real-time monitoring of uncertainty in received navigation signals from the navigation system 104. Thus, the ANP indicates a magnitude of potential uncertainty in the real time positioning of the aircraft 100 during flight. Furthermore, the communication interface 106 receives information for a required navigation performance (RNP) instrument flight procedure for the aircraft 100, from ground-based traffic controllers, or from the flight manager 105, that indicates a fixed-route accuracy and containment boundaries required during flight for the aircraft 100 to fly a path between two points along a flight path. The containment boundaries are defined by a flight path centerline with limits determined by associated margins.

The data storage 108 may include or take the form of one or more computer-readable storage media that can be read or accessed by the processor(s) 110. The computer-readable storage media can include volatile and/or non-volatile storage components, such as optical, magnetic, organic or other memory or disc storage, which can be integrated in whole or in part with the processor(s) 110. The data storage 108 is considered non-transitory computer readable media. In some embodiments, the data storage 108 can be implemented using a single physical device (e.g., one optical, magnetic, organic or other memory or disc storage unit), while in other embodiments, the data storage 108 can be implemented using two or more physical devices.

The data storage 108 thus is a non-transitory computer readable storage medium, and executable instructions 118 are stored thereon. The instructions 118 include computer executable code. When the instructions 118 are executed by the system 102 that has the one or more processor(s) 110, the system 102 is caused to perform functions. Such functions include calculating modifications to a flight path, and these functions are described more fully below.

The data storage 108 further stores spacing input 120 from an air traffic controller (ATC) that indicates spacing requirements between the aircraft 100 and one or more other aircraft, and information 122 relating to communities underneath the flight path. The spacing input 120 and the information 122 relating to communities underneath the flight path may be received at the communication interface 106 and then stored in the data storage 108.

The processor(s) 110 may be a general-purpose processor or a special purpose processor (e.g., digital signal processors, application specific integrated circuits, etc.). The processor(s) 110 may receive inputs from the communication interface 106, and process the inputs to generate outputs that are stored in the data storage 108 and output to the display 114. The processor(s) 110 can be configured to execute the executable instructions 118 (e.g., computer-readable program instructions) that are stored in the data storage 108 and are executable to provide the functionality of the system 102 described herein.

As one example, the processor(s) 110 execute the executable instructions 118 stored on the data storage 108 to calculate a modification to the flight path to be flown by the aircraft 100 that causes the aircraft 100 to remain within the containment boundaries of the RNP instrument flight procedure while reducing noise impact to the communities underneath the flight path and meeting the spacing requirements of the air traffic controller.

The processor(s) 110 can execute the executable instructions 118 stored in the data storage 108 to perform functions in real-time during flight of the aircraft 100. Such function can then occur with no or little delay to process additional data received from other sources or through manual input. The real time processing means that the processor(s) 110 perform the actions during flight of the aircraft 100. The real time processing may continually process information received from the communication interface 106. Put another way, the real time aspect includes the system 102 deciding to modify the flight path of the aircraft 100 substantially immediately upon receiving new or updated spacing requirements between the aircraft 100 and one or more other aircraft, and new or updated information 122 relating to communities underneath the flight path. By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In one example, the information 122 relating to communities includes real time community noise inquiries received by the communication interface 106, and the processor(s) 110 further determine the modified flight path for the aircraft 100 so as to steer the aircraft 100, in approximately real time, in response to the information 122. Here, "approximately" indicates with little to no delay, or with no delay due to processing of additional data.

The output interface 112 outputs a modified flight path for the aircraft 100. The output interface 112 can output the modified flight path to the display 114 or to other aircraft or ground-based systems as well. Thus, the output interface 112 may be similar to the communication interface 106 and can be a wireless interface (e.g., transmitter) or a wired interface as well.

The navigation system 104 includes a Global Navigation Satellite System (GNSS) receiver 119 configured to provide data that is typical of well-known Global Positioning System (GPS) systems, such as the coordinates of the aircraft 100. Position estimates provided by the GNSS receiver 119 can be replaced or augmented to enhance accuracy and stability by inputs from other sensors, such motion and rate sensors 121, camera and optical sensors 123, and radio frequency (RF) systems 124. Such navigation data may be utilized by the system 102 for various functions, such as to navigate to a target position. The navigation system 104 may also include hardware to enable communication within the navigation system 104 and between the navigation system 104 and other devices (not shown). The hardware may include transmitters, receivers, and antennas, for example.

The navigation system 104 may also include other components such as a multi-mode receiver that uses other aviation-approved sources of navigation information. The RF systems 124 may include radar systems for ranging and target detection or Instrument Landing Systems (ILS) and various GNSS Augmentation Systems such as the Ground Based Augmentation System (GBAS). The camera and optical sensors 123 may include light detection and ranging (LIDAR) systems, laser detection and ranging (LADAR) systems, and/or an infrared or forward-looking infrared (FLIR) system, among other possibilities.

The camera and optical sensors 123 can also include an imaging system, such as a video camera, to capture image data from an environment. As a specific example, charge-coupled device (CCD) cameras or complementary metal-oxide-semiconductor (CMOS) cameras can be used, among other possibilities. Thus, the camera and optical sensors 123 can include a visual camera. The camera and optical sensors 123 can also include a night-vision camera and/or a forward looking infrared radar device or an infrared camera. The camera and optical sensors 123 may capture imagery of the environment and compare the imagery to what is expected given a current estimated position to help with navigation.

The flight manager 105 includes one or more processor(s) 125 that accesses data storage 126 to retrieve information for communication with the system 102 through an output interface 127. As one example, the flight manager 105 retrieves an RNP instrument flight procedure 128 for the aircraft 100 from the data storage 126 and provides the RNP instrument flight procedure 128 to the system 102 via the output interface 127. The RNP instrument flight procedure 128 indicates a fixed-route accuracy and containment boundaries required during flight for the aircraft 100 to fly a path between two points along a flight path. The processor(s) 125 may also execute instructions for RNP monitoring 129 stored within the data storage 126 to monitor a flight path of the aircraft 100.

The aircraft 100 can be operated using performance based flight path variation to intentionally add beneficial variability into aircraft track-keeping, while honoring any required performance constraints while executing PBN operations. New functions described herein provide variation management and alternate flight paths constrained by required performance that are integrated with existing flight management system functions. The functions can enhance safety by de-concentrating air traffic, reduce environmental impact by spreading noise, and can also provide additional longitudinal aircraft spacing and timing control in en-route, arrival and approach operations.

The performance based flight path variation exploits existing measurement of real-time position uncertainty determined in an actual navigation performance (ANP) to dynamically bound potential track variation to predefined limits. The system 102 will add variability to the tracking performance during RNAV and RNP procedures while remaining within the constraints of the defined required performance by using real-time ANP. These functions can be used as airplane stand-alone capabilities to improve noise distributions, meet timing or spacing goals and/or to enhance safety by implementing airline specific open-loop variation distributions or aircrew input variations to address known or expected issue areas. These capabilities can also be integrated with ground systems to provide additional benefits.

Within examples, PBN and RNP implementations include limits on allowable variations, and containment boundaries of position of the aircraft 100 as referenced to a flight path centerline that can be tracked using real-time monitoring of the aircraft position and ANP uncertainty based on received navigation signals. RNP is distinct from general RNAV systems in that it requires a real-time measurement of ANP, which is an estimation of a maximum position uncertainty of the aircraft 100.

Generally, ANP has been used only as a trigger value for performance and alerting. Real-time determined ANP that is substantially better than required for the aircraft 100 to successfully execute a given RNP procedure has not been exploited. While guidelines for and certified budgets for flight paths may be on the order of half the required performance value (e.g., 0.5 nautical mile (NM) for an RNP 1 procedure), navigation systems can often provide a substantially smaller ANP (e.g., 0.04 NM). This difference, or a portion thereof, can be used in real-time to provide purposeful variation in a defined flight path. As ANP changes, the aircraft 100 can adjust allowed variations to ensure flight performance requirements are met.

Figure 2:
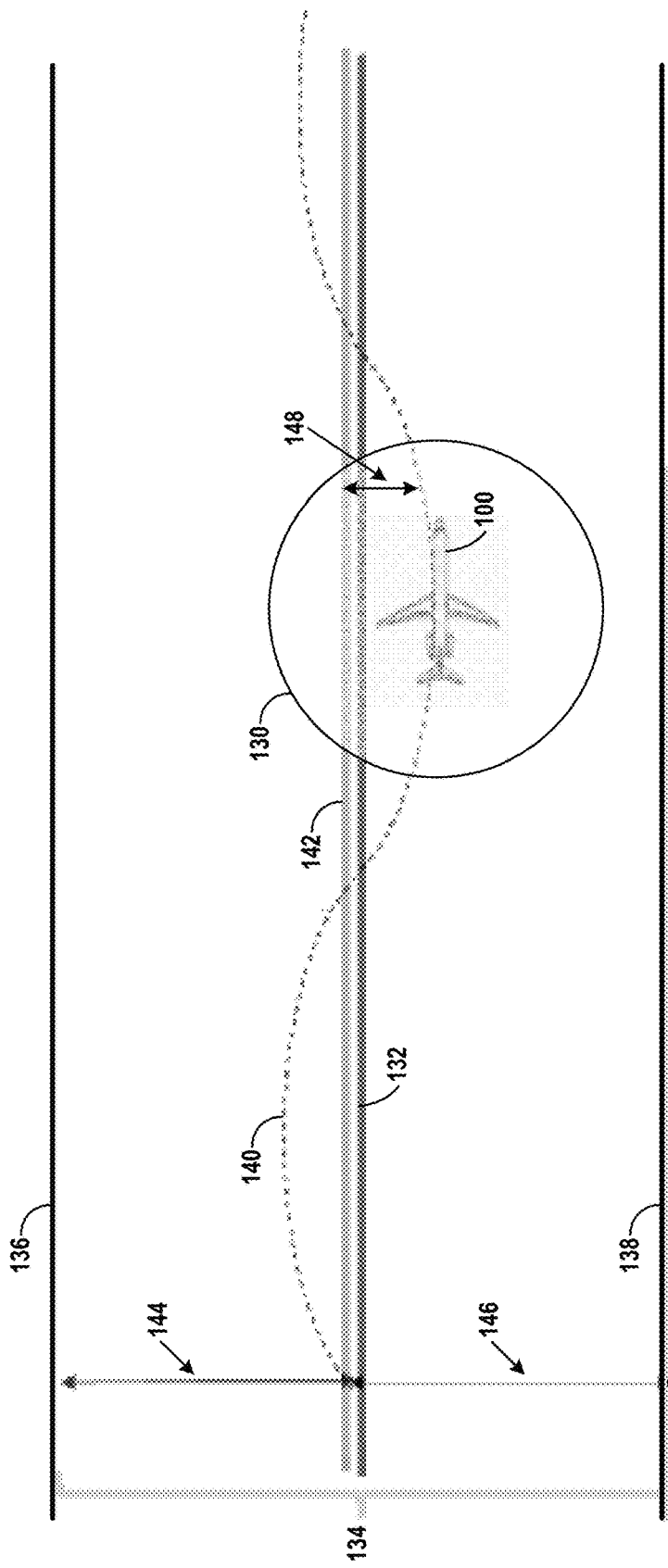
FIG. 2 is a diagram illustrating a flight path for the aircraft and an application of variability introduced to a flight path centerline.

FIG. 2 is a diagram illustrating a flight path 140 for the aircraft 100 and an application of variability introduced to a flight path centerline. In FIG. 2, an ANP 130 of the aircraft 100 can be determined that indicates uncertainty in real time positioning of the aircraft 100 during flight based on information derived from the navigation system 104 onboard the aircraft 100. The ANP 130 is shown as an area in which the aircraft 100 is might be located, providing limits on a worst-case true physical position or geographic location of the aircraft 100. The ANP 130 may be determined based on the information available from the navigation system 104 as well as a flight path centerline 142, which is based on a published procedure centerline flight path 132 information from the data storage 126.

An RNP instrument flight procedure 134 for the aircraft 100 is shown to indicate a fixed-route accuracy and containment boundaries 136 and 138 required during flight for the aircraft 100 to fly a path between two points along the flight path 132. The containment boundaries 136 and 138 are defined by the published procedure centerline flight path 132 with limits determined by associated margins 144 and 146 on either side of the published procedure centerline flight path 132.

Since a possible location of the aircraft 100, represented by the ANP 130, is determined to be within the containment boundaries 136 and 138 of the RNP instrument flight procedure 134, there is additional spacing available within the margins 144 and 146 for use to add variability to the flight path centerline 142. Thus, the system 102 onboard the aircraft 100 can calculate a new flight path 140 to be flown by the aircraft 100. A modification to the flight path centerline 142 resulting in the new flight path 140 may be based on spacing input 120 received from the ATC that indicates spacing requirements between the aircraft 100 and one or more other aircraft, as well as information 122 relating to communities underneath the flight path centerline 142. The modification can be calculated so that the aircraft 100 remains within the containment boundaries 136 and 138 of the RNP instrument flight procedure 134 while reducing noise impact to the communities underneath the flight path centerline 142 and meeting the spacing requirements of the ATC.

In one example, the margin 144 is a distance away from the flight path centerline 142 along a first direction and the margin 146 is the same distance away from the flight path centerline 142 along a second direction, and a variation 148 can be calculated from the flight path centerline 142 along either direction (e.g., in FIG. 2 along the second direction) so as to be within the distance of the margin 146. Here, the aircraft 100 can then fly along the flight path 140 at the variation 148 from the flight path centerline 142 to introduce variability to the flight path 140. Thus, an alternate flight path can be calculated within the distance of the first margin 144 and the second margin 146 and accounting for the ANP 130.

As shown in FIG. 2, the variation 148 can be determined at different points along the flight path 140 due to changing values of the RNP instrument flight procedure 134 along the flight path centerline 142 and changing values of the ANP 130 during flight. Thus, the aircraft 100 can fly a dynamically varying flight path 140 on a straight procedure flight segment in the presence of varying ANP 130 while remaining with the allowed margins 144 and 146 about the flight path centerline 142.

An amount of the variation 148 can be determined based on a difference between the real time positioning of the aircraft 100 and the margin 146, and this difference can be used to limit the modification to the flight path 140 to be flown by the aircraft 100.

In other examples, the modification to the flight path 140 to be flown by the aircraft 100 can be based on a residual flight margin available for use that is due to the ANP 130, the flight path centerline 142, the RNP instrument flight procedure 134, and the containment boundaries 136 and 138. The calculated flight margin is a distance available on each side of the flight path centerline 142 within the containment boundaries 136 and 138 that is available for use after accounting for the ANP 130. A flight error tolerance may be established based on flight guidelines that enable some default error in flight path. Further, the flight margin can be determined at different points along the flight path 140 due to changing values of the RNP instrument flight procedure 134 along the flight path 140 and changing values of the ANP 130 during flight.

By applying modifications to the flight path 140, the aircraft 100 can be steered, in approximately real time, in response to the information 122 relating to communities underneath the published procedure centerline 134 or in response to spacing or timing inputs received from ATC. This may enable noise distribution by varying aircraft paths over communities and/or adjustments to spacing of the aircraft 100 with respect to other aircraft and/or adjusting a time of arrival of the aircraft 100 at a given point in space.

Figure 3:
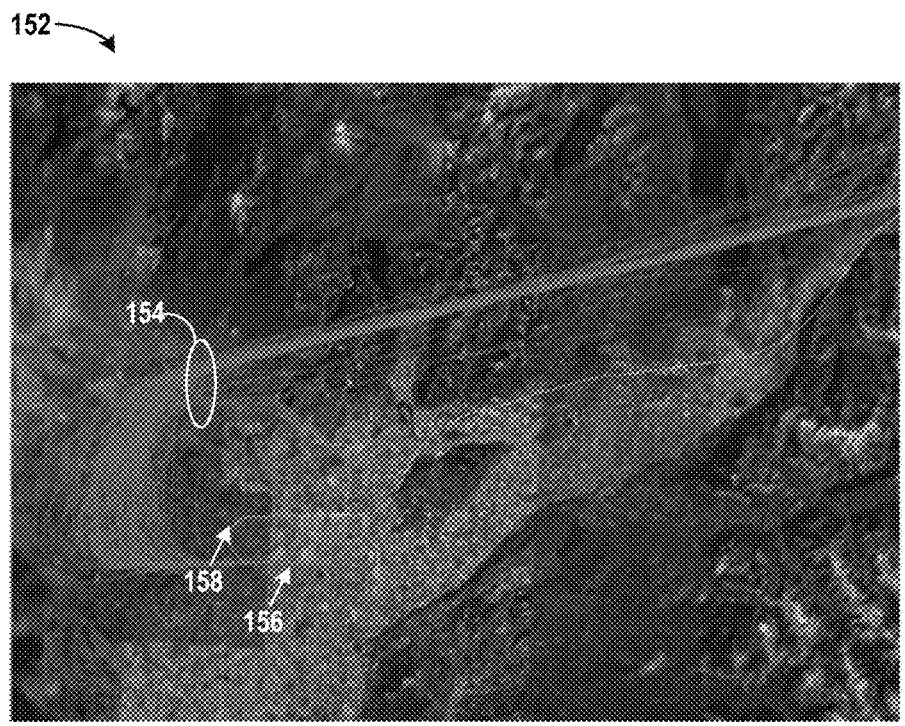
FIG. 3 illustrates an example an airport vicinity map of recorded flight paths for approaches to an airport, from which community noise exposure can be determined.

FIG. 3 illustrates an example an airport vicinity map 152 of recorded flight paths for approaches to an airport 156, from which a noise exposure map can be determined. FIG. 3 illustrates the very high repeatability and precise path following capabilities of RNP approaches 158 compared to a similar number of tracks from conventional traffic management 154, and also illustrates a need for introducing variability into flight paths. Part of the variability in the tracks from conventional traffic management 154 was due to ATC using vectoring and similar methods taking aircraft off of their baseline path to achieve spacing and timing goals. Using the ANP margin can regain some of this control authority.

Figure 4:
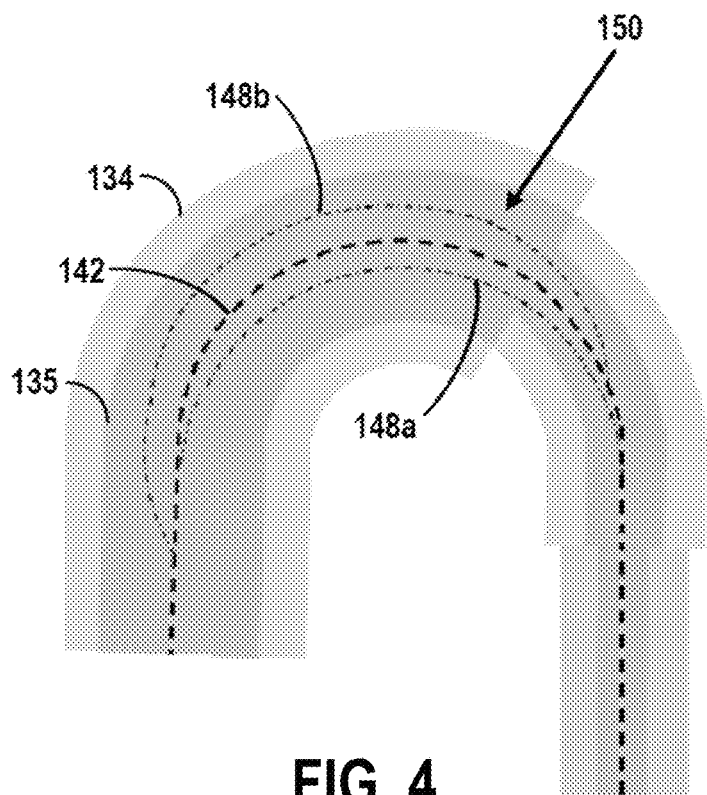
FIG. 4 is a diagram illustrating the flight path centerline, the associated margins of the RNP instrument flight procedure and an application of variability introduced in a context of a curved RNP approach procedure.

FIG. 4 is a diagram illustrating the flight path centerline 142 and an application of variability introduced in a context of a curved RNP approach procedure. In FIG. 4, variations 148a-b are shown at different points along the flight path but within the RNP procedure 134 boundaries and a boundary in consideration of measured ANP 135. The variation 148a is an example for a path deviation inside of the flight path centerline 142 during the turn, and the variation 148b is an example deviation outside of the flight path centerline 142. An ANP-considered available flight margin 150 is illustrated as the darker shaded area on either side of the flight path centerline 142. FIG. 4 illustrates an example where the designated RNP value in the published procedure centerline 134 changes and the measured ANP 135 has remained constant, so the available flight margin 150 in which flight path variation can be applied is commensurably changed.

In FIG. 4, the path deviation on the inside of the turn 148a would result in a shortened or compressed overall path and therefore a potential advancing of the aircraft 100 with respect to an aircraft in the traffic stream ahead of aircraft 100 resulting in a decrease in spacing. Similarly, the path deviation on the outside of the turn 148b would result in a lengthened or stretched overall path and therefore a potential delaying of the aircraft 100 with respect to an aircraft in the traffic stream ahead of aircraft 100 resulting in an increase in spacing.

Figure 5:
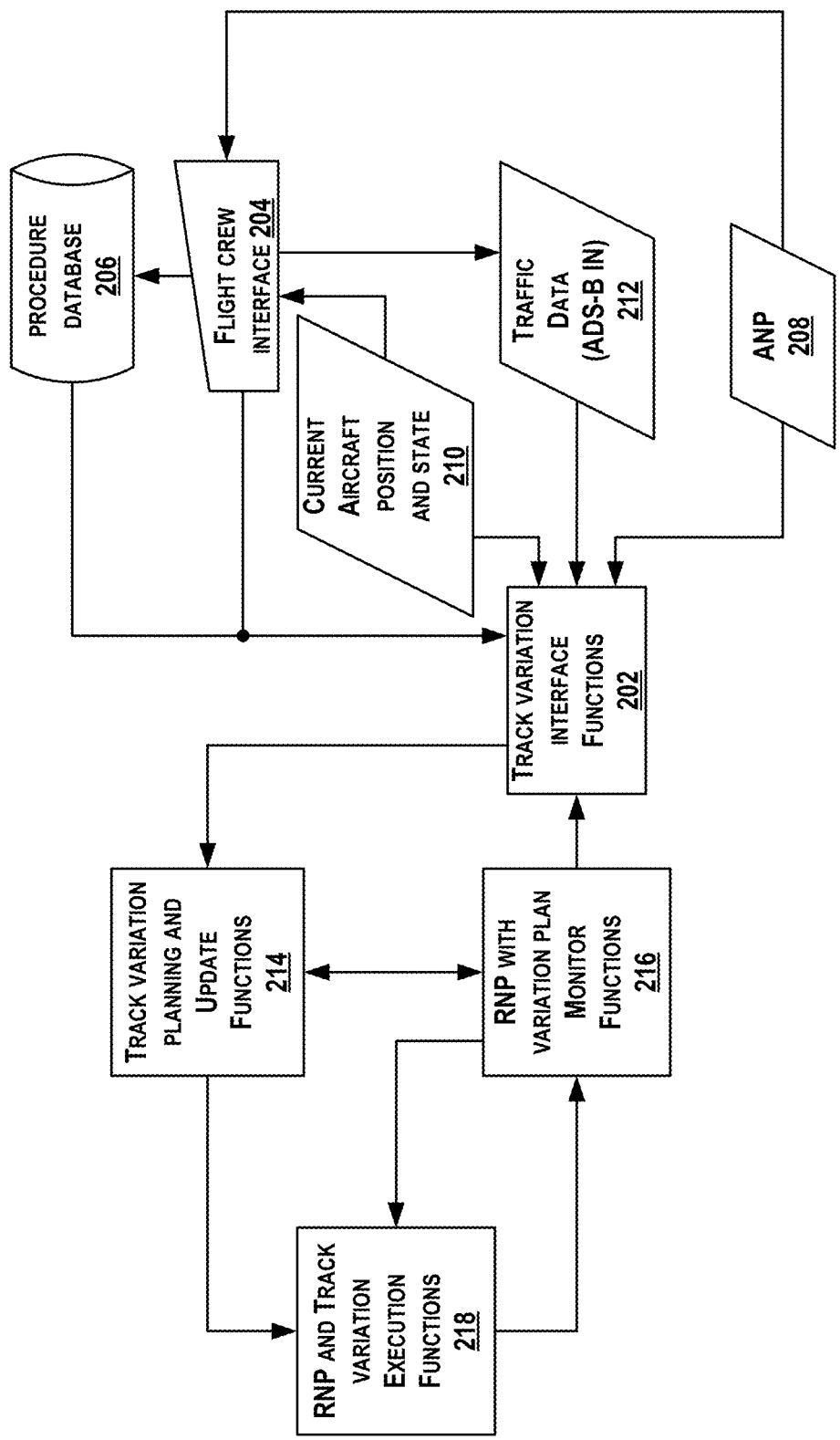
FIG. 5 is a block diagram illustrating example inputs to and functions performed by the aircraft to generate a variable flight path while remaining within the associated margins of the RNP instrument flight procedure.

FIG. 5 is a block diagram illustrating example inputs to and functions performed by the aircraft 100 to generate a variable flight path 140. Track Variation interface functions 202 include interfaces that receive or output information to and from external sources. Example information received may include user input from flight crew interfaces 204, such as implemented on a flight deck device with a control and display unit in the form of a page with selectable actions and parameters and text providing status or option choices. Other example information includes a flight manager or electronic flight bag instrument procedure database 206, which includes instrument procedures available to be flown by the aircraft 100 and all required data for a procedure, such as waypoints and path segments that define centerlines, RNP values etc. Further example information includes an ANP 208 input, current aircraft position and state 210 (including aircraft position and speed information available from the navigation system 104), and traffic data 212. The traffic data 212 includes automatic dependent surveillance-broadcast in (ADS-B IN) data including aircraft identification, position and speed broadcast by an aircraft. An ADS-B traffic processor receives these broadcasts from other nearby aircraft and assembles them into data, a map, or a picture of nearby traffic that can be used by various applications, for example, for aircrew situational awareness or, in this case, managing variation paths to enhance safety while increasing timing and spacing control authority.

Track variation planning and update functions 214 receive information from the RNP interface functions 202, and define scope, objectives and limitations for variation in flight paths, and then also build the variation plan (or path) that will meet the objectives within the defined scope and limitations, including the limitation imposed by the procedure RNP bounds and the navigation performance. In an example where the objectives cannot be met within the limits and scope imposed, the Track Variation planning and update functions 214 can implement a "best effort" variation plan that scales the variation and the objectives to what is achievable or can request new objectives and/or scope from the user.

The track variation planning and update functions 214 thus use the RNP instrument flight procedure performance requirements, measured ANP 208, flight mode information from the user input or from a flight manager function, and the current and trends in previous position and state to determine the flight margin (FM) 150. The flight margin 150 may be a margin within the procedure's defined RNP procedure containment boundaries 136 and 138 that can be used for purposeful variation. The flight margin 150 is determined by the procedure's baseline centerline, the ANP and detected trends in dynamic ANP changes, and the flight technical error (FTE) budget for the current flight mode (e.g., auto flight, flight director or manually flown) based on current and downstream RNP designation. As an example, flight margin (FM)=RNP−ANP−FTE—a dynamically-adjusted buffer. The flight margin 150 is a margin or variation distance available on each side of the procedure baseline centerline, i.e., a flight margin of 0.5 NM means that the 0.5 NM on either side of the centerline is available to use for adding variation by generating a modified flight path 140.

The flight margin 150 may vary at different points along the planned route due to changing RNP values, for example, if the scope of the variable operation spans multiple RNAV/RNP procedures (e.g., an en-route, arrival, and approach procedures) or if a single procedure has different RNP values associated with different segments (e.g., many approach procedures have an RNP of 1 NM outside of the final approach fix (FAF) and 0.3 NM within the FAF). The flight margin 150 may also vary if ANP changes (for example, the number of GNSS satellites within view of the navigation system 104 changes).

The track variation planning and update functions 214 may also take into account general operational constraints and preferences. These may be associated with types of procedures (e.g., approaches), specific procedures (e.g., one of the approach procedures for a specific airport), all procedures, or procedures with certain characteristics (e.g., RNP of 0.5 or less). These constraints and preferences can take general forms (e.g., use only ½ of the available flight margin for variation) or can be specific (e.g., avoid a left 0.5 NM for the last 2 NM of approach procedure x.1).

The track variation planning and update functions 214 may also receive traffic location and velocity inputs from the traffic data ADS-B IN 212, develop traffic tracks over time, and combine data with instrument procedure data from procedure database 206 to build a variation-relevant picture of what nearby aircraft traffic is doing. The variation-relevant air traffic picture includes information indicating aircraft traffic and associated procedures of the traffic, and offsets or variations from the procedure baseline centerlines for each traffic aircraft. This variation-relevant air traffic picture can be used in developing a modified flight path 140 by positioning the aircraft path in a beneficial way with respect to nearby aircraft paths within the RNP procedure containment limits.

The track variation planning and update functions 214 determines applicable variations that may consider noise spreading or path spreading for safety or spacing enhancements by randomly selecting or specifying applicable variation targets. Some strategies for the variable path generation include random or deterministically-created fixed distance offsets, fixed margin offsets (e.g. offset related to RNP-ANP), damped pseudo-random path variation functions, fixed offset ADS-B stagger (e.g., maximize offset from aircraft(s) in front using other aircraft position feedback from ADS-B IN or other surveillance systems) or fixed margin ADS-B stagger paths. These modified paths are developed to remain within the relevant RNP procedure margins, including the consideration of changing ANP and FTE budgets.

The track variation planning and update functions 214 may also determine path stretching or compression for spacing and time-of-arrival control using sinusoidal or S-turn path stretching, constrained vectors path stretching (shallow angle off path, followed by shallow angle return to path, repeat as required), damped pseudo-random path variation, or curved segment shortening or lengthening (as shown in FIG. 4).

The track variation planning and update functions 214 may use ADS-B or other air traffic position data to coordinate the spacing and time-of-arrival path variations with the paths and locations of other aircraft to enhance safety or to reduce noise impacts. These modified paths are developed to remain within the relevant RNP procedure margins, including the consideration of ANP and any FTE budgets.

The RNP with variation plan monitor functions 216 review outputs of the Track Variation planning and update functions 214 for changes that may occur due to changing ANP 208 input. The RNP with Variation Plan Monitor Functions 216 further display the performance of the aircraft with the respect to the bounding procedure baseline centerline based RNP boundaries, the current ANP 208, and the currently active variation path from the track variation planning and update functions 214.

In turn, RNP path execution functions 218 cause the aircraft 100 to fly the modified flight path within the limits of the RNP procedure. The RNP path execution function 218 could, for example, take advantage of native functions within the flight manager 105 (as in FIG. 1) such as processors 125 and retrieval of executable instructions for RNP monitoring 129.

Figure 6:
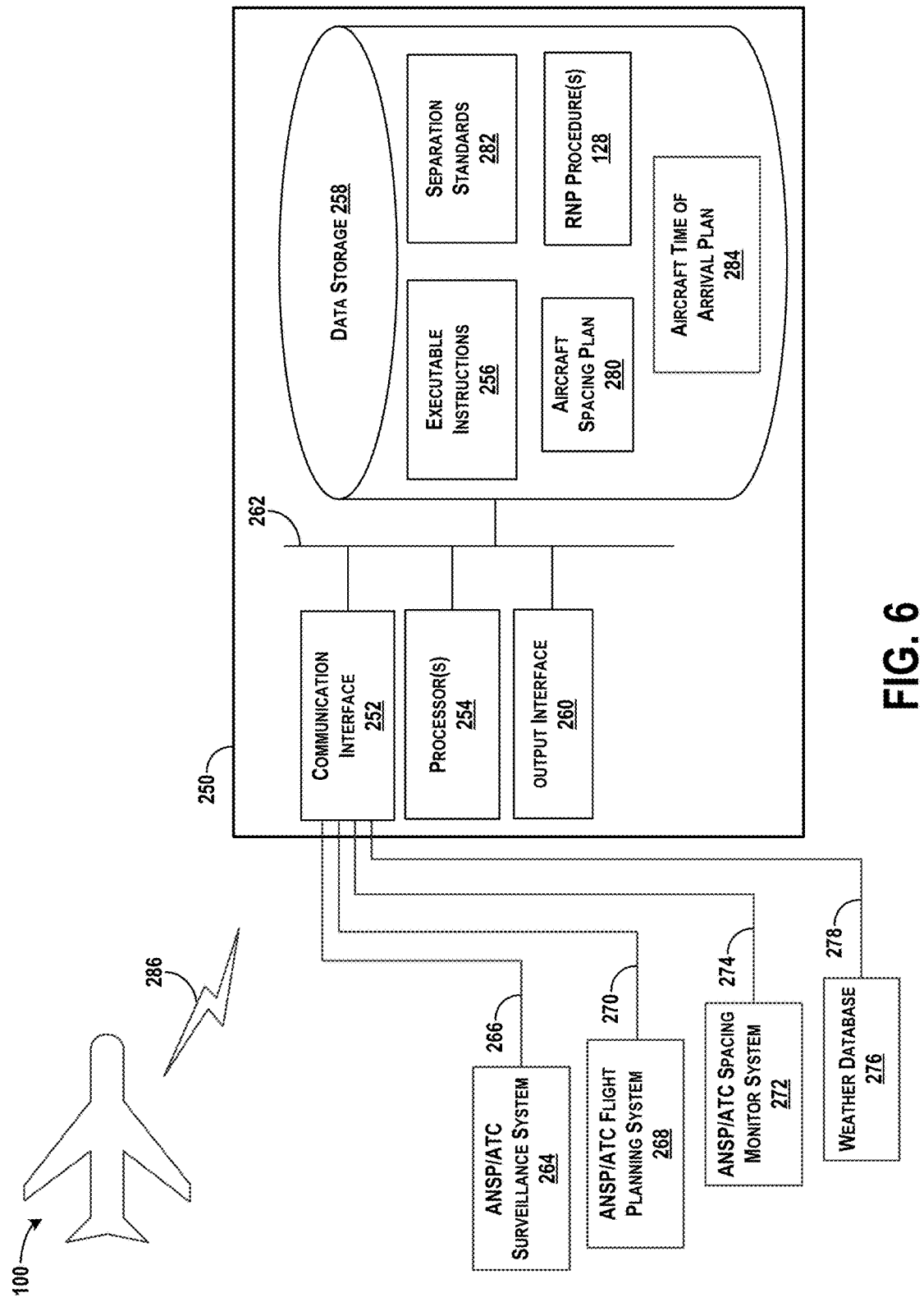
FIG. 6 is a block diagram of an aircraft traffic spacing and timing control system, according to an example embodiment.

FIG. 6 is a block diagram of an aircraft traffic spacing and timing control system 250, according to an example embodiment. The system 250 includes a communication interface 252, one or more processor(s) 254 for executing instructions 256 stored on data storage 258, and an output interface 260 each connected to a communication bus 262. The system 250 may also include hardware to enable communication within the system 250 and between the system 250 other devices (not shown). The hardware may include transmitters, receivers, and antennas, for example. The system 250 may take the form of a computing device in some examples.

The communication interface 252 may be a wireless interface and/or one or more wireline interfaces that allow for both short-range communication and long-range communication to one or more networks or to one or more remote devices. Such wireless interfaces may provide for communication under one or more wireless communication protocols, such as voice communications using Very High Frequency (VHF) radio, VHF Data link (VDL), VDL Mode 2, Aircraft Communications Addressing and Reporting System (ACARS) digital communications over VHF radio and satellite communications (SATCOM), Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include aircraft data buses such as Aeronautical Radio, Incorporated (ARINC) 429, 629, or 664 based interfaces, Ethernet interface, a Universal Serial Bus (USB) interface, or similar interface to communicate via a wire, a twisted pair of wires, a coaxial cable, an optical link, a fiber-optic link, or other physical connection to a wireline network.

Thus, the communication interface 252 may be configured to receive input data from one or more devices, and may also be configured to send output data to other devices. The communication interface 252 may also be or include a receiver and transmitter to receive and send data. In other examples, the communication interface 252 may also include a user-interface, such as a keyboard, microphone, touchscreen, etc., to receive inputs as well. In other examples, the communication interface 252 may also include a virtual user-interface, such as a website, server ports or other networked interfaces to receive inputs as well.

In examples described below, the communication interface 252 receives information of aircraft traffic for an area. The information of aircraft traffic may be received from an air navigation service provider (ANSP)/air traffic controller (ATC) surveillance system 264 over a communication link 266. The communication link 266 may be a wireless or wired link. The surveillance system 264 receives information from aircraft and monitors aircraft location and speed, for example.

The communication interface 252 also receives information from an ANSP/ATC flight planning system 268 over a communication link 270, and the information may include the RNP procedure(s) 128. The communication interface 252 also receives information from the ANSP/ATC spacing monitoring system 272 over a communication link 274, and the information may include distances between aircraft in flight and speeds as well as geographic locations of the aircraft. The communication interface 252 also receives information from other databases as well, such as a weather database 276 over a communication link 278. The communication links 270, 274, and 278 can be wireless or wired.

The data storage 258 may include or take the form of one or more computer-readable storage media that can be read or accessed by the processor(s) 254. The computer-readable storage media can include volatile and/or non-volatile storage components, such as optical, magnetic, organic or other memory or disc storage, which can be integrated in whole or in part with the processor(s) 254. The data storage 258 is considered non-transitory computer readable media. In some embodiments, the data storage 258 can be implemented using a single physical device (e.g. one optical, magnetic, organic or other memory or disc storage unit), while in other embodiments, the data storage 258 can be implemented using two or more physical devices.

The data storage 258 thus is a non-transitory computer readable storage medium, and executable instructions 256 are stored thereon. The instructions 256 include computer executable code. When the instructions 256 are executed by the flight path management system 250 that has the one or more processor(s) 254, the system 250 is caused to perform functions. Such functions include calculating modifications to a flight path, and these functions are described more fully below.

The processor(s) 254 may be a general-purpose processor or a special purpose processor (e.g., digital signal processors, application specific integrated circuits, etc.). The processor(s) 254 may receive inputs from the communication interface 252, and process the inputs to generate outputs that are stored in the data storage 258 and output to the output interface 260. The processor(s) 254 can be configured to execute the executable instructions 256 (e.g., computer-readable program instructions) that are stored in the data storage 258 and are executable to provide the functionality of the system 250 described herein.

In one example, the processor(s) 254 execute the instructions 256 stored on the data storage 258 to determine an aircraft spacing plan 280 for the aircraft traffic for the area based on spacing requirements due to one or more separation standards 282 or flow management for the aircraft traffic, and to determine that a modification to the flight path 132 of the aircraft 100 is required to meet a longitudinal spacing requirement between the aircraft 100 and one or more additional aircraft of the aircraft traffic based on the aircraft spacing plan 280. In examples, the aircraft 100 is flying an RNP instrument flight procedure 128 that indicates a fixed-route accuracy and the containment boundaries 136 and 138 required during flight for the aircraft 100 to fly a path between two points along the flight path 132. The containment boundaries 136 and 138 are defined by the flight path centerline 142 with limits determined by the associated margins 144 and 146.

In further examples, the processor(s) 254 execute the instructions 256 stored on the data storage 258 to determine an aircraft time of arrival plan 284 based on the information of aircraft traffic for the area, and determine that the modification to the flight path of the aircraft is required to meet a required time of arrival based on the aircraft time of arrival plan 284.

The data storage 258 further stores the aircraft spacing plan 280, the separation standards 282, the aircraft time of arrival plan 284, and the RNP instrument flight procedure(s) 128 for aircraft. The RNP instrument flight procedure(s) 128 may be that as provided to the aircraft 100 and shown and described in FIGS. 1-2.

The output interface 260 outputs to the aircraft 100, based on the modification, a flight path modification to the flight path 132 via a data communication link 286. The flight path modification causes the aircraft 100 to remain within the associated margins 144 and 146 of the RNP instrument flight procedure 128/134 and alters the longitudinal spacing between the aircraft 100 and the one or more additional aircraft of the aircraft traffic. A modification to the flight path centerline 142 resulting in the new flight path 140 may be based on the aircraft spacing plan 280.

The data communication link 286 may be wireless and may provide for communication under one or more wireless communication protocols, such as voice communications using Very High Frequency (VHF) radio, VHF Data link (VDL), VDL Mode 2, Aircraft Communications Addressing and Reporting System (ACARS) digital communications over VHF radio and satellite communications (SATCOM), Long-Term Evolution (LTE), cellular communications, and/or other wireless communication protocols. Thus, the output interface 260 may be similar to the communication interface 252 and can be a wireless interface (e.g., transmitter) as well as providing wired communications where appropriate.

The processor(s) 254 can execute the executable instructions 256 stored in the data storage 258 to perform functions in real-time during flight of the aircraft 100. Such function can then occur with no or little delay to process additional data received from other sources or through manual input. The real time processing means that the processor(s) 254 perform the actions during flight of the aircraft 100. The real time processing may continually process information received from the communication interface 252. Put another way, the real time aspect includes the system 250 deciding to modify the flight path of the aircraft 100 substantially immediately upon receiving new or updated noise inquires. By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The system 250 may perform functions for monitoring or varying longitudinal spacing between aircraft to dynamically manage aircraft longitudinal spacing on fixed-route clearances. Using purposeful variation allowed within the RNP procedure(s) 128, along-track distance, and therefore spacing, can be managed during highly constrained phases of flight, e.g., departure, arrival, and approach. Longitudinal spacing control via path variation can be used instead of or in addition to speed control. This function integrates PBN functionality, new or existing RNAV/RNP flight procedures, existing air traffic voice or modified data-link clearance capabilities, and ground or aircraft flight deck based interval or time-of-arrival management functions. Thus, the aircraft traffic separation and spacing control with dynamic path variation capability couples ground and airplane based capabilities to provide improved air traffic control authority for aircraft longitudinal and diagonal spacing on RNP procedures. This capability extends aircraft speed control capabilities with the path stretching and compression capabilities that are constrained by RNP procedure limitations.

For ground ATC managed spacing, ground functions include an ability to track relative positions and speeds of aircraft through surveillance systems, such as primary or secondary surveillance radars or automatic dependent surveillance systems (e.g., ANSP/ATC surveillance system 264 in FIG. 6). The ANSP/ATC monitoring system 272 provides relative spacing information between aircraft used to provide input to automated functions for the system 250 that would take estimates of aircraft speed and path variation based control margins and desired spacing and margins to develop a target spacing. This target spacing would be allocated between the aircraft being spaced to develop by-aircraft advance or delay targets and assignments. These advance/delay targets would then be relayed by the data communication link 286 (or voice communications) to the assigned aircraft.

The flight path modification request communicated by the flight path management system 250 to the aircraft 100 via a data communication link 286 can range from a simple pre-coordinated or pre-set path variation request, perhaps suitable to be communicated by voice, or a request for a target change in spacing or a target change in time of arrival, to a request for a target variation path defined in detail, communicated for example by digital datalink.

Various levels of integration with existing aircraft and ground communications systems can be used to convey a flight path modification request. The flight path modification request communicated by the flight path management system 250 to the aircraft 100 via the data communication link 286 may use direct communications between the flight path management system 250 communication interface 252 and the aircraft 100 communication interface 106. The flight path modification request may alternatively utilize existing aircraft 100 and ground system communication systems and links that interface to the respective communication interfaces. Alternatively, the flight path modification request may be implemented as voice communications between ground based controllers and the flight crew with the requisite data be retrieved from or entered into the flight path management system 250 and aircraft system 102 via their respective communications and output interfaces.

The aircraft traffic separation and spacing control with dynamic path variation capability is particularly effective when implemented with aircraft equipped with the performance based track variation for aircraft flight management capability, but also works for non-performance based track variation equipped aircraft. The ground segment functionality could send variation or offset requests to any RNAV-equipped aircraft, and in these examples, the aircrew would then either input the offset or variation using existing offset capabilities in the flight management systems, or would fly to the directed offset or variation using aircraft instruments such as Horizontal Situation Indicator (HSI). In addition, the crew may monitor existing navigation performance feedback, using aircraft instruments such as navigation performance scales. The ground based system method for any RNAV-equipped aircraft would have an advantage of providing some of the spacing control and time of arrival benefits at an earlier time than that supported by avionics and aircraft equipage updates.

Figure 7:
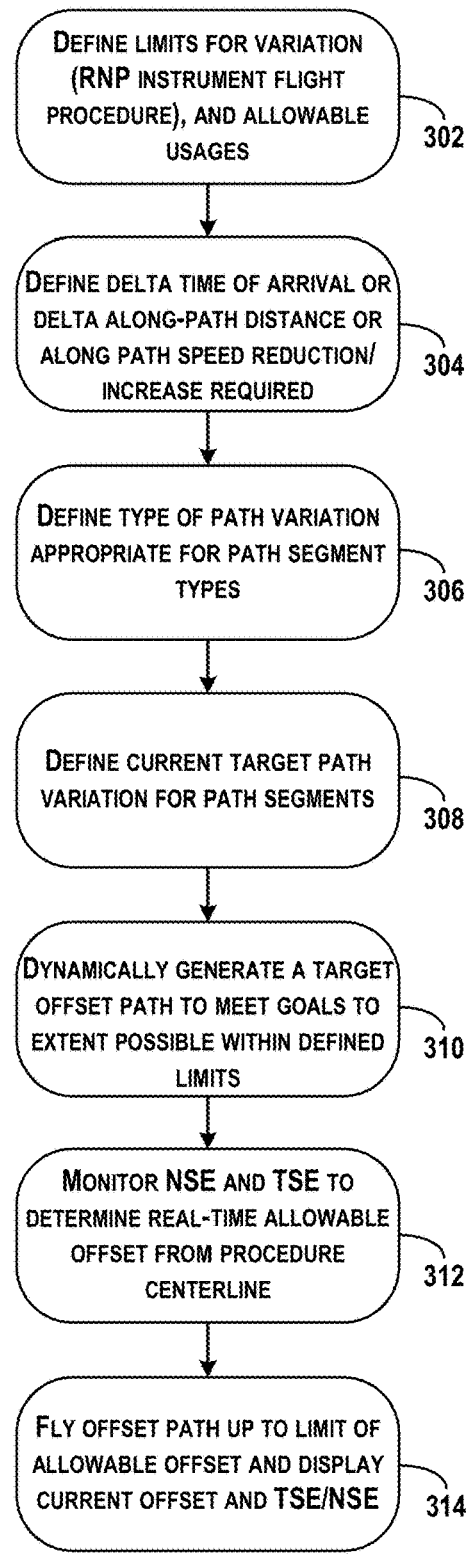
FIG. 7 is an example flow diagram illustrating some functions performed by the system, in an example embodiment.

FIG. 7 is an example flow diagram illustrating some functions performed by the system 250, in an example embodiment. Initially, as shown at block 302, algorithms in the aircraft are used to determine allowed/prohibited variation values so as to define limits for variation. This may be based on the RNP procedure(s) 128 assigned to the aircraft. Following, at block 304, a delta for time of arrival or delta along-path distance or along path speed reduction/increase can be defined. At block 306, values can be defined to determine a type of path variation that limit where and how a path variation can be applied (e.g., allowed maximum values and targeted distribution profiles, define no-variation-allowed regions (noise avoidance regions)), and that are appropriate for path segment types (arrival/departure). Then, at block 308, a current target path variation for path segments is defined, followed by dynamically generating a target path to meet the goals to the extent possible, at block 310.

Following, at block 312, the navigation system error (NSE) and total system error (TSE) in flight is monitored to determine real-time allowable variation from the flight centerline that are available. At block 314, the aircraft is then instructed to fly the newly-generated path to the extent allowed by the aircraft.

Figure 8:
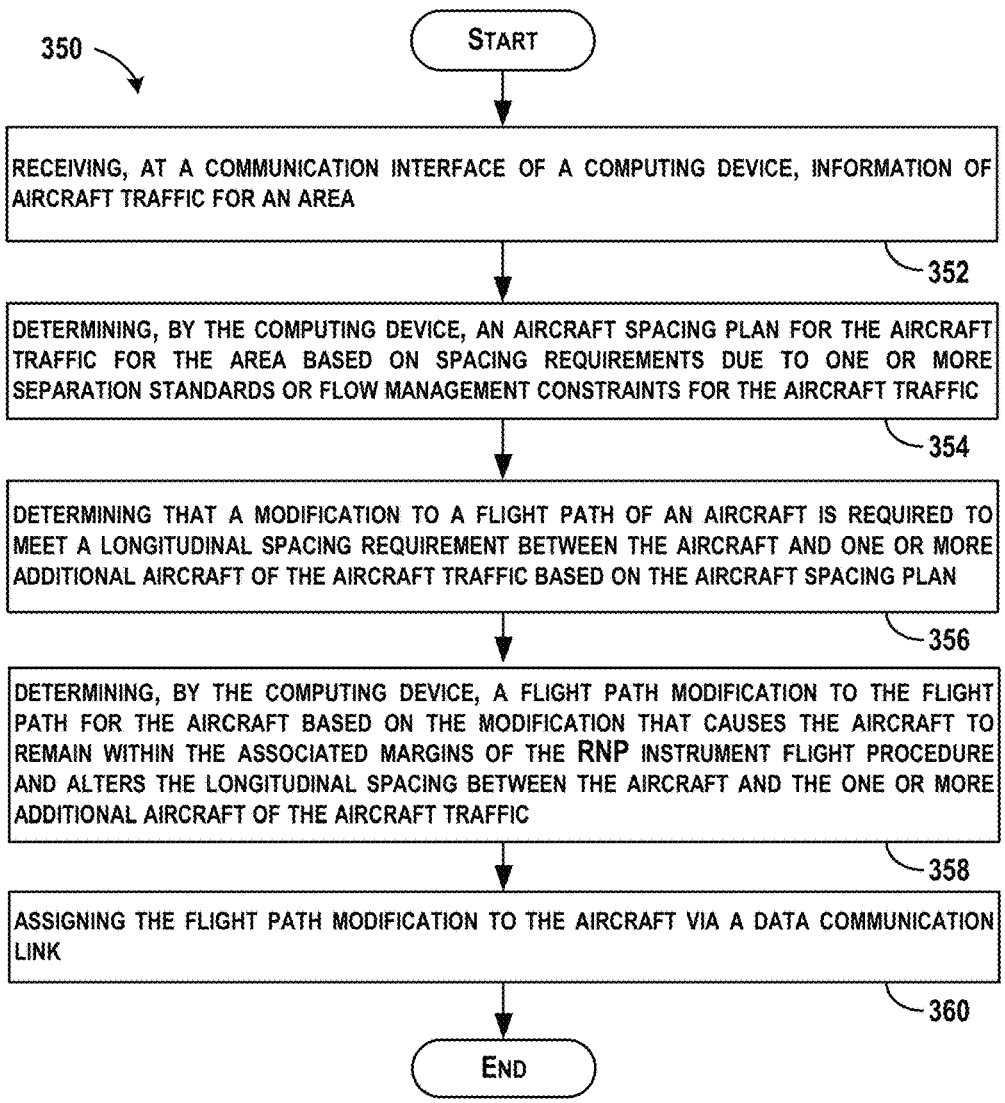
FIG. 8 shows a flowchart of an example method for flight path variation of the aircraft for noise management, according to an example embodiment.

FIG. 8 shows a flowchart of an example method 350 for flight path variation of the aircraft 100 for noise management, according to an example embodiment. Method 350 shown in FIG. 8 presents an embodiment of a method that could be used with the aircraft 100 shown in FIG. 1, for example, and may be performed by the flight path management system 250 shown in FIG. 6. Further, devices or systems may be used or configured to perform logical functions presented in FIG. 8. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 350 may include one or more operations, functions, or actions as illustrated by one or more of blocks 352-360. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 8 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 352, the method 350 includes receiving, at the communication interface 252 of a computing device (e.g., the system 250), information of aircraft traffic for an area.

At block 354, the method 350 includes determining, by the computing device, the aircraft spacing plan 280 for the aircraft traffic for the area based on spacing requirements due to one or more separation standards 282 or flow management constraints for the aircraft traffic. The separation standards 282 and the flow management constraints may be set by airports or ATC, and an example of one or both includes maintaining vertical separation of at least 1,000 feet and horizontal separation of at least 10 minutes (depending on speed of the aircraft). Within examples, the aircraft spacing plan 280 may include relative spacing between aircraft of the aircraft traffic based on estimates of real time aircraft speed. Flow management constraints may also include how many aircraft land over a time period, or how many aircraft take-off over a time period, for example. Flow management constraints may also indicate timing of aircraft increasing or decreasing altitude during flight so as to maintain spacing separation between other aircraft, for example.

At block 356, the method 350 includes determining that a modification to the flight path 132 of the aircraft 100 is required to meet a longitudinal spacing requirement between the aircraft 100 and one or more additional aircraft of the aircraft traffic based on the aircraft spacing plan 280. In one example, the aircraft 100 is flying an RNP instrument flight procedure 128/134 that indicates a fixed-route accuracy and the containment boundaries 136 and 138 required during flight for the aircraft 100 to fly a path between two points along the flight path 132, and the containment boundaries 136 and 138 are defined by the flight path centerline 142 with limits determined by the associated margins 144 and 146.

At block 358, the method 350 includes determining, by the computing device, a flight path modification to the flight path 132 for the aircraft based on the modification that causes the aircraft 100 to remain within the associated margins 144 and 146 of the RNP instrument flight procedure 128/134 and alters the longitudinal spacing between the aircraft 100 and the one or more additional aircraft of the aircraft traffic.

At block 360, the method 350 includes assigning the flight path modification to the aircraft 100 via the data communication link 286.

The flight path modification may be determined in real-time, and then the flight path modification can be assigned in real-time to the aircraft 100 to cause the aircraft 100 to fly a modified flight path.

The flight path modification may include a flight path stretch or a flight path compression within limitations of the RNP instrument flight procedure 128/134. An example flight path stretch can include determining a sinusoidal flight path for the aircraft 100 that lengthens the flight path 132 and increases the longitudinal spacing between the aircraft 100 and the one or more additional aircraft of the aircraft traffic while maintaining the aircraft 100 within the RNP instrument flight procedure 128/134, such as the example of the new flight path 140 shown in FIG. 2.

The flight path modification may also include a lateral variation to the flight path from the flight path centerline 142. In still other examples, the flight path modification can include a shortening or lengthening to a curved segment of the flight path while maintaining the aircraft 100 within the associated margins 144 and 146 of the RNP instrument flight procedure 128/134 (as shown in FIG. 4).

The flight path modification may be a randomly selected fixed distance offset from the flight path centerline 142. The flight path modification can also include a path off of the flight path centerline 142 followed by returning to the flight path centerline 142 for path stretching while maintaining the aircraft 100 within the associated margins 144 and 146 of the RNP instrument flight procedure 128/134.

In further examples, the flight path modification can include symmetric path variations about the flight path centerline 142 to apply in a sinusoidal manner. Or, in other examples, the flight path modification includes a single side variation to the flight path centerline 142.

Figure 9:
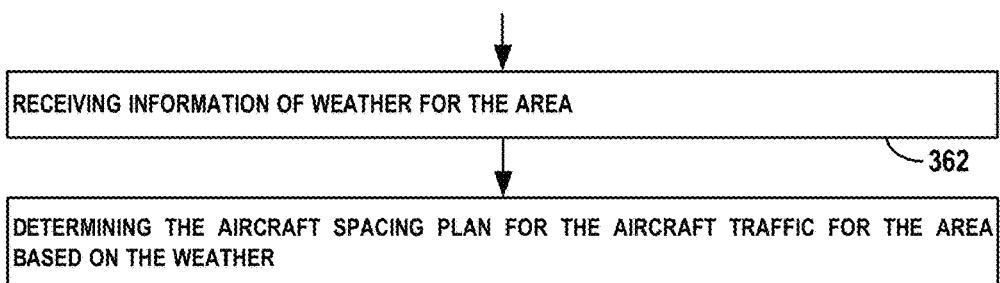
FIG. 9 shows a flowchart of an example method for use with the method, according to an example embodiment.

FIG. 9 shows a flowchart of an example method for use with the method 350, according to an example embodiment. At block 362, functions include receiving information of weather for the area, and at block 364 the functions include determining the aircraft spacing plan 280 for the aircraft traffic for the area based on the weather.

Figure 10:
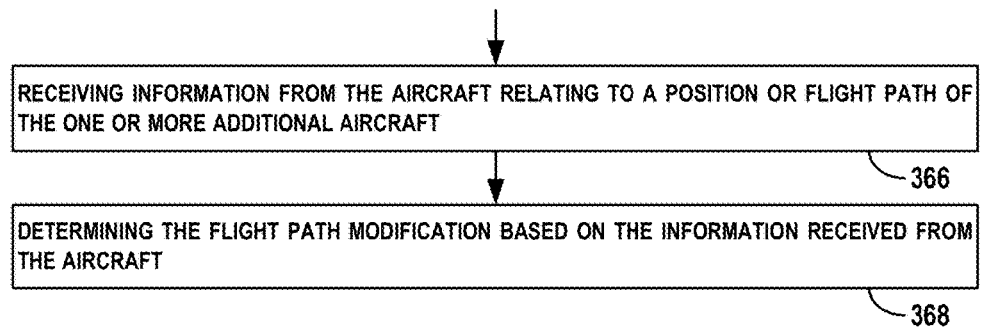
FIG. 10 shows a flowchart of another example method for use with the method, according to an example embodiment.

FIG. 10 shows a flowchart of another example method for use with the method 350, according to an example embodiment. At block 366, functions include receiving information from the aircraft 100 relating to a position or flight path of the one or more additional aircraft, and at block 368 functions include determining the flight path modification based on the information received from the aircraft 100.

Figure 11:
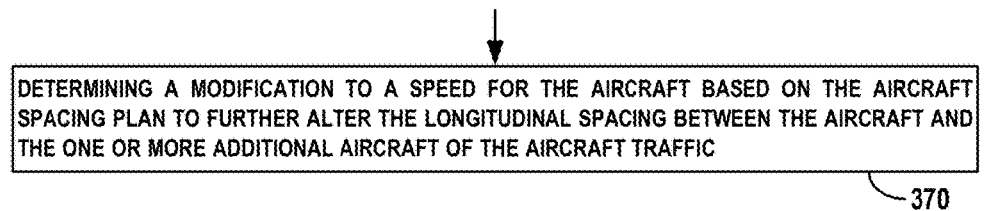
FIG. 11 shows a flowchart of another example method for use with the method, according to an example embodiment.

FIG. 11 shows a flowchart of another example method for use with the method 350, according to an example embodiment. At block 370, functions include determining a modification to a speed for the aircraft 100 based on the aircraft spacing plan 280 to further alter the longitudinal spacing between the aircraft 100 and the one or more additional aircraft of the aircraft traffic.

Figure 12:
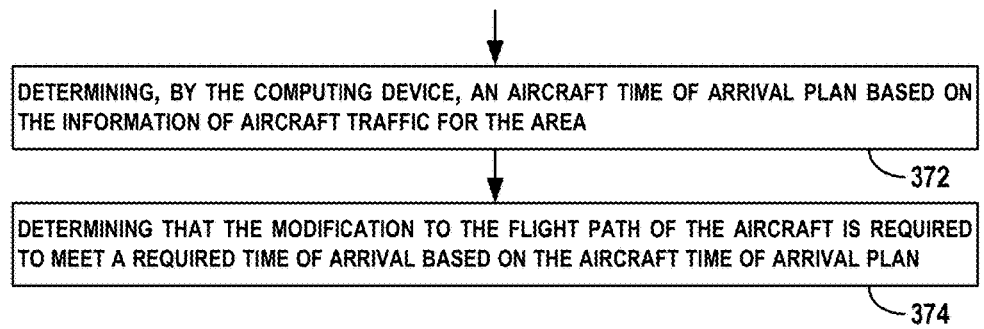
FIG. 12 shows a flowchart of another example method for use with the method, according to an example embodiment.

FIG. 12 shows a flowchart of another example method for use with the method 350, according to an example embodiment. At block 372, functions include determining, by the computing device, an aircraft time of arrival plan based on the information of aircraft traffic for the area, and at block 374 functions include determining that the modification to the flight path of the aircraft is required to meet a required time of arrival based on the aircraft time of arrival plan.

Figure 13:
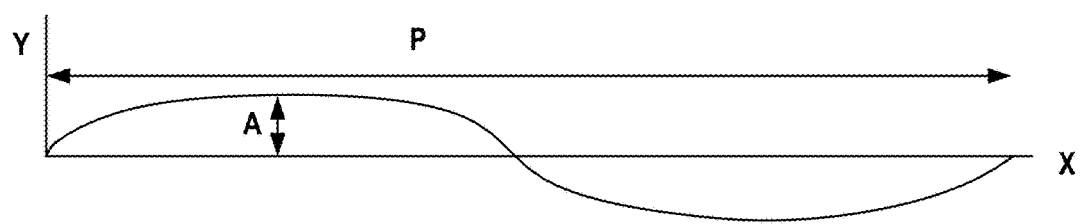
FIG. 13 illustrates an example of parameters useful for determining the flight path modification as a sinusoidal variation, according to an example embodiment.

FIG. 13 illustrates an example of parameters useful for determining the flight path modification as a sinusoidal variation, according to an example embodiment. In some examples, this allows for path stretching on a straight segment to enhance longitudinal spacing control. The flight path modification may maximize future control authority options while meeting (or attempting to meet) a requested time delta.

As shown in FIG. 13, X is a longitudinal coordinate (along path location), Y is a lateral coordinate (variation from centerline), P is a period length for a sinusoidal curve (minimized to increase path stretch, limited by user defined limitations, flight control limitations (e.g. bank angle limitations) and flight quality considerations) (e.g., $P_{min-i}$ is a minimum allowed period for segment i), and A is an amplitude for sinusoidal curve (maximized to increase path stretch, limited by RNP and ANP values, user defined deviation limitations, flight control limitations (e.g. bank angle limitations) and flight quality considerations) (e.g., $A_{Max-i}$ is a maximum allowed amplitude for segment i).

An equation for lateral variation from the flight path centerline, shown in FIG. 13 as a sinusoidal path, includes: $y = A \sin((2\pi/P)*x)$.

For a path length with a sinusoidal variation (arc length of sinusoidal path), and an arc length for 1 period of a sine path, first a slope for curve is determined as follows: $dy/dx = A*(2\pi/P)*\cos((2\pi/P)*x)$.

The arc length for 1 period, $L_P$, is determined by using this derivative in the arc length curve over 1 full period of the function as follows:

$$L_P = \int_a^b \sqrt{1 + \left(\frac{dy}{dx}\right)^2}\, dx$$

$$L_P = \int_0^P \sqrt{1 + (A*(2\pi/P)*\cos((2\pi/P)*x))^2}\, dx$$

A total arc length for the segment can be determined by multiplying per period arc length by the number of periods in the segment as follows: $L_S = S/P*L_P$, where $L_P$ is an arc length for one period, $L_S$ is an arc length for full segment, and S is a total segment length (a length of the procedure segment available to use for path stretching (e.g., $S_i$ is a segment length available for segment i).

An example flight path modification for path stretch or time delay for an approach segment may be calculated as follows. For an RNP of 1 instrument landing system (ILS) overlay approach with 5 NM between initial approach fix (IAF) and final approach fix (FAF) and an approach speed of V=150 knots assuming a deviation period P of 2.5 NM (shallow S turn) and an amplitude of 0.3 NM (assume ANP=0.1, margin available in procedure is 1 NM−0.1 NM=0.9 NM) with limits to ⅓ of available margin, the following parameters are defined:

S=5 NM (Procedure Segment length available to perform path stretch over)
A=0.3 NM (variation amplitude−maximum variation distance on one side of centerline)
P=2.5 NM (Period of along-path length of sinusoid)
$L_S$=S/P*$L_P$ (Arc Length or actual path distance flown along sinusoidal path)
$L_S$=5/2.5*$\int_0^{2.5}\sqrt{1+(0.3*(2\pi/2.5)*\cos((2\pi/2.5)*x))^2}\,dx$
$L_P$=~2.8 NM (linear segment approximation−less than actual arc length)
$L_S$=5/2.5*2.8=5.6 NM (total path length flown along sinusoidal path)
ΔD=$L_S$−S=5.6 NM−5 NM=0.6 NM (distance flown beyond nominal path), where ΔD=(arc-length flown−straight line segment length) and $ΔD_{TARGET}$=Path stretch requested or path stretch target.
Path stretching ratio=delta distance over straight line or original distance=ΔD/S=0.6/5=12%.
ΔT=ΔD/V=0.6 NM/150 NM/Hour*3600 sec/hour=14.4 sec (time delay to complete flying segment beyond time to fly nominal path), where ΔT=Delta distance/speed, $ΔT_{achievable-i}$=maximum ΔT achievable for or segment i, and $ΔT_{TARGET}$=Time delay requested or time delay target.
Time delay ratio=delta time over time to fly straight line or original distance=ΔT/(S/V)=14.4 sec/120 sec=12%.

Parameters for a determination of variation using a sinusoidal variation path to meet a delta time input can be defined as follows:

$ΔT_{TARGET}$=Time delay requested or time delay target
$ΔT = S/P*\int_0^{P}\sqrt{1+(A*(2\pi/P)*\cos((2\pi/P)*x))^2}\,dx - S/V$,
where A, P, and S are selected.

In one example, the flight path modification may be determined to maximize future control options for $ΔT_{TARGET}$ where $ΔT_{TARGET}$ is achieved over current segment if possible, extended into next nearest segment, etc. if needed (goal to allow margin in later segments to provide additional control capability if needed). To do so, ΔT is determined to be achieved in current segment length S with current P and A limitations as follows:

$$ΔT_{achievable-i} = S_i \Big/ P^*_{mini-i}$$

$$\left( \int_0^{P_{min-i}} \sqrt{1 + \left( \frac{A(\max-i)*\left(\frac{2\pi}{P(\min-i)}\right)*}{\cos\left(\left(\frac{2\pi}{P(\min-i)}\right)*x\right)} \right)^2 } \, dx \right) - S_i/V$$

IF $ΔT_{achievable-i} \geq ΔT_{TARGET}$, then current segment is used to meet target ΔT: $S = S_i$.

In one example, a longest period (P) may be used by setting $A_i = A_{max\_}I$, and solve for $P_i$ using following equation ($P_i$ is only unknown):

$$ΔT_{TARGET} = S_i \Big/ P^*_i$$

$$\left( \int_0^{P_i} \sqrt{1 + \left(A(\max-i)*\left(\frac{2\pi}{P(i)}\right)*\cos\left(\left(\frac{2\pi}{P(i)}\right)*x\right)\right)^2 }\, dx \right) - S_i/V$$

In another example, a lowest amplitude (A) may be used by setting $P_i = P_{min\_}I$, and solving for $A_i$ using following equation ($A_i$ is only unknown):

$$ΔT_{TARGET} = S_i \Big/ P^*_{min-i}$$

$$\left( \int_0^{P_i} \sqrt{1 + \left(A(i)*\left(\frac{2\pi}{P(\min-i)}\right)*\cos\left(\left(\frac{2\pi}{P(\min-i)}\right)*x\right)\right)^2 }\, dx \right) - S_i/V$$

In still another example, $A_i$ and $P_i$ are selected to minimize variation slope etc., as follows: ELSE IF $\Delta T_{achievable-i} < \Delta T_{TARGET}$ THEN: use current segment to meet as much of target $\Delta T$ as possible–$\Delta T_{achievable-i}$, then use next segment to meet as much of remaining target $\Delta T$ as possible–$\Delta T_{achievable-i+1}$, and if $\Delta T_{TARGET}$ still not met–continue until target met or all segments available have been used and target not met.

In another example implementation, the flight path modification may be determined to minimize deviation for a requested $\Delta T_{TARGET}$. Here, $\Delta T_{TARGET}$ can be achieved using all available segments to minimize the variation required. The functioning is similar to logic above, but A and P are balanced over all available segments to meet the target.

In still another implementation, the flight path modification may be determined to maximize future control options for $\Delta D_{TARGET}$. Here, $\Delta D_{TARGET}$ can be achieved at an earliest time for Distance. The core equation in this case is:

$$\Delta D = S/P * L_P = \int_0^P \sqrt{1+(A*(2\pi/P)*\cos((2\pi/P)*x))^2} dx - S$$

Logic is similar to the approach above used to select P, A and S values.

In still another implementation, the flight path modification may be determined to minimize deviation for a requested $\Delta D_{TARGET}$. Here, $\Delta D_{TARGET}$ can be achieved using all available segments to minimize the variation required, and logic similar to above can be used to balance A and P over all available segments to meet target.

Example systems and methods described enable many benefits including noise spreading, localized (and potentially dynamic) noise avoidance, and path stretching or compression for longitudinal spacing adjustments (ground requested or aircrew initiated). Further, safety enhancements can be realized using path variation randomization to further decrease a probability that inadvertently co-path flights are on the same path.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for aircraft traffic spacing and timing control with flight path variation of an aircraft, comprising:
receiving, at a communication interface of a computing device, information of aircraft traffic for an area;
determining, by the computing device, an aircraft spacing plan for the aircraft traffic for the area based on spacing requirements due to one or more separation standards or flow management constraints for the aircraft traffic;
determining that a modification to a flight path of an aircraft is required to meet a longitudinal spacing requirement between the aircraft and one or more additional aircraft of the aircraft traffic based on the aircraft spacing plan, wherein the aircraft is flying a required navigation performance (RNP) instrument flight procedure that indicates a fixed-route accuracy and containment boundaries required during flight for the aircraft to fly a path between two points along the flight path, and wherein the containment boundaries are defined by a flight path centerline with limits determined by associated margins;
determining, by the computing device, a flight path modification to the flight path for the aircraft based on the modification that causes the aircraft to remain within the associated margins of the RNP instrument flight procedure and alters the longitudinal spacing between the aircraft and the one or more additional aircraft of the aircraft traffic, wherein determining the flight path modification comprises determining a sinusoidal flight path for the aircraft that lengthens the flight path and increases the longitudinal spacing between the aircraft and the one or more additional aircraft of the aircraft traffic while maintaining the aircraft within the RNP instrument flight procedure; and
assigning the flight path modification to the aircraft via a data communication link.

2. The method of claim 1, wherein determining the aircraft spacing plan comprises determining relative spacing between aircraft of the aircraft traffic based on estimates of real time aircraft speed.

3. The method of claim 1, wherein determining the flight path modification to the flight path for the aircraft comprises determining in real-time the flight path modification, and
wherein assigning the flight path modification to the aircraft via the data communication link comprises assigning in real-time the flight path modification to the aircraft to cause the aircraft to fly a modified flight path.

4. The method of claim 1, wherein determining the flight path modification to the flight path for the aircraft comprises determining one of a flight path stretch or a flight path compression within limitations of the RNP instrument flight procedure.

5. The method of claim 1, wherein determining the flight path modification to the flight path for the aircraft based on the modification comprises determining a lateral variation to the flight path from the flight path centerline.

6. The method of claim 1, wherein determining the flight path modification to the flight path for the aircraft based on the modification comprises determining a shortening or lengthening to a curved segment of the flight path while maintaining the aircraft within the associated margins of the RNP instrument flight procedure.

7. The method of claim 1, wherein determining the flight path modification to the flight path for the aircraft based on the modification comprises determining one or more randomly selected distance offsets from the flight path centerline.

8. The method of claim 1, wherein determining the flight path modification to the flight path for the aircraft based on the modification comprises determining a path off of the flight path centerline followed by returning to the flight path centerline for path stretching while maintaining the aircraft within the associated margins of the RNP instrument flight procedure.

9. The method of claim 1, wherein determining the flight path modification to the flight path for the aircraft based on the modification comprises determining symmetric path variations about the flight path centerline to apply in a sinusoidal manner.

10. The method of claim 1, wherein determining the flight path modification to the flight path for the aircraft based on the modification comprises determining one or more single side offsets to the flight path centerline.

11. The method of claim 1, further comprising:
receiving information of weather for the area; and
determining the aircraft spacing plan for the aircraft traffic for the area based on the weather.

12. The method of claim 1, further comprising:
receiving information from the aircraft relating to a position or flight path of the one or more additional aircraft; and
determining the flight path modification based on the information received from the aircraft.

13. The method of claim 1, further comprising:
determining a modification to a speed for the aircraft based on the aircraft spacing plan to further alter the longitudinal spacing between the aircraft and the one or more additional aircraft of the aircraft traffic.

14. The method of claim 1, further comprising:
determining, by the computing device, an aircraft time of arrival plan based on the information of aircraft traffic for the area; and
determining that the modification to the flight path of the aircraft is required to meet a required time of arrival based on the aircraft time of arrival plan.

15. An aircraft traffic spacing and timing control system comprising:
a communication interface for receiving information of aircraft traffic for an area;
one or more processors for executing instructions stored on data storage to determine an aircraft spacing plan for the aircraft traffic for the area based on spacing requirements due to one or more separation standards or flow management constraints for the aircraft traffic, and to determine that a modification to a flight path of an aircraft is required to meet a longitudinal spacing requirement between the aircraft and one or more additional aircraft of the aircraft traffic based on the aircraft spacing plan, wherein the aircraft is flying a required navigation performance (RNP) instrument flight procedure that indicates a fixed-route accuracy and containment boundaries required during flight for the aircraft to fly a path between two points along the flight path, and wherein the containment boundaries are defined by a flight path centerline with limits determined by associated margins, wherein the modification to the flight path comprises a sinusoidal flight path for the aircraft that lengthens the flight path and increases the longitudinal spacing between the aircraft and the one or more additional aircraft of the aircraft traffic while maintaining the aircraft within the RNP instrument flight procedure; and
an output interface for outputting to the aircraft, based on the modification, a flight path modification to the flight path via a data communication link, wherein the flight path modification causes the aircraft to remain within the associated margins of the RNP instrument flight procedure and alters the longitudinal spacing between the aircraft and the one or more additional aircraft of the aircraft traffic.

16. The aircraft traffic spacing and timing control system of claim 15, wherein the one or more processors determine the flight path modification to the flight path for the aircraft based on the modification by determining a lateral variation to the flight path from the flight path centerline.

17. The aircraft traffic spacing and timing control system of claim 15, wherein the one or more processors determine the flight path modification to the flight path for the aircraft based on the modification by determining symmetric path variations about the flight path centerline to apply in a sinusoidal manner.

18. A non-transitory computer readable storage medium having stored therein instructions, that when executed by a system having one or more processors, causes the system to perform functions comprising:
receiving information of aircraft traffic for an area;
determining an aircraft spacing plan for the aircraft traffic for the area based on spacing requirements due to one or more separation standards or flow management constraints for the aircraft traffic;
determining that a modification to a flight path of an aircraft is required to meet a longitudinal spacing requirement between the aircraft and one or more additional aircraft of the aircraft traffic based on the aircraft spacing plan, wherein the aircraft is flying a required navigation performance (RNP) instrument flight procedure that indicates a fixed-route accuracy and containment boundaries required during flight for the aircraft to fly a path between two points along the flight path, and wherein the containment boundaries are defined by a flight path centerline with limits determined by associated margins;
determining a flight path modification to the flight path for the aircraft based on the modification that causes the aircraft to remain within the associated margins of the RNP instrument flight procedure and alters the longitudinal spacing between the aircraft and the one or more additional aircraft of the aircraft traffic, wherein determining the flight path modification comprises determining a sinusoidal flight path for the aircraft that lengthens the flight path and increases the longitudinal spacing between the aircraft and the one or more additional aircraft of the aircraft traffic while maintaining the aircraft within the RNP instrument flight procedure; and
assigning the flight path modification to the aircraft via a data communication link.

19. The non-transitory computer readable storage medium of claim 18, wherein determining the flight path modification to the flight path for the aircraft comprises determining one of a flight path stretch or a flight path compression within limitations of the RNP instrument flight procedure.

20. The non-transitory computer readable storage medium of claim 18, wherein determining the flight path modification to the flight path for the aircraft comprises determining in real-time the flight path modification, and
wherein assigning the flight path modification to the aircraft via the data communication link comprises assigning in real-time the flight path modification to the aircraft to cause the aircraft to fly a modified flight path.

* * * * *